(12) United States Patent
Lee et al.

(10) Patent No.: US 8,999,575 B2
(45) Date of Patent: Apr. 7, 2015

(54) POSITIVE ELECTRODE AND LITHIUM BATTERY INCLUDING THE SAME

(75) Inventors: Soon-Rewl Lee, Yongin-si (KR);
Ick-Kyu Choi, Yongin-si (KR);
Young-Ki Kim, Yongin-si (KR);
Jay-Hyok Song, Yongin-si (KR);
Young-Hun Lee, Yongin-si (KR); Yu-Mi Song, Yongin-si (KR); Yoon-Chang Kim, Yongin-si (KR)

(73) Assignee: Samsung SDI Co., Ltd. (KR)

( * ) Notice: Subject to any disclaimer, the term of this patent is extended or adjusted under 35 U.S.C. 154(b) by 769 days.

(21) Appl. No.: 13/101,645

(22) Filed: May 5, 2011

(65) Prior Publication Data

US 2012/0021284 A1    Jan. 26, 2012

(30) Foreign Application Priority Data

Jul. 20, 2010  (KR) .................. 10-2010-0070078

(51) Int. Cl.
*H01M 4/13*    (2010.01)
*H01M 4/131*   (2010.01)
(Continued)

(52) U.S. Cl.
CPC .......... *H01M 4/131* (2013.01); *H01M 10/0525* (2013.01); *H01M 4/364* (2013.01);
(Continued)

(58) Field of Classification Search
CPC ..... H01M 4/131; H01M 4/364; H01M 4/366; H01M 4/485; H01M 4/525; H01M 10/0525; H01M 4/48; H01M 4/505; C01G 39/00; C01G 39/006; C01G 53/006; C01P 2002/72; C01P 2002/52; Y02E 60/122

USPC .......... 429/218.1, 220, 221, 223, 224, 231.5, 429/231.6
See application file for complete search history.

(56) References Cited

U.S. PATENT DOCUMENTS

| 5,759,719 A | 6/1998 | Mao |
| 6,040,090 A | 3/2000 | Sunagawa et al. |

(Continued)

FOREIGN PATENT DOCUMENTS

| CN | 1745490 A | 3/2006 |
| CN | 1983680 A | 6/2007 |

(Continued)

OTHER PUBLICATIONS

Japanese Office Action dated May 7, 2013 of corresponding Japanese Patent Application No. 2011-153722—2 pages.

(Continued)

*Primary Examiner* — Gary Harris
(74) *Attorney, Agent, or Firm* — Knobbe Martens Olson & Bear LLP (57) ABSTRACT

Disclosed is a positive electrode and a lithium battery including the positive electrode. The positive electrode includes a current collector, a first layer irreversibly deintercalating lithium ions, and a second layer allowing reversible intercalation and deintercalation of lithium ions. In one embodiment, the first layer further comprises a first sublayer and a second sublayer, in which the first sublayer is interposed between the current collector and the second sublayer. The first sublayer comprises a first active material represented by Formula 1 $Li_2Mo_{1-n}R^1_nO_3$, and the second sublayer comprises a second active material represented by Formula 2 $Li_2Ni_{1-m}R^2_mO_2$. In Formula 1, $0 \leq n < 1$; and $R^1$ is selected from the group consisting of manganese (Mn), iron (Fe), cobalt (Co), copper (Cu), zinc (Zn), magnesium (Mg), nickel (Ni), and combinations of at least two of the foregoing elements. In Formula 2, $0 \leq m < 1$; and $R^2$ is selected from the group consisting of Mn, Fe, Co, Cu, Zn, Mg, molybdenum (Mo), and combinations of at least two of the foregoing elements.

18 Claims, 4 Drawing Sheets

(51) Int. Cl.
  *H01M 10/0525* (2010.01)
  *H01M 4/36* (2006.01)
  *H01M 4/485* (2010.01)
  *H01M 4/525* (2010.01)
  *C01G 39/00* (2006.01)
  *C01G 53/00* (2006.01)
  *H01M 4/48* (2010.01)
  *H01M 4/505* (2010.01)

(52) U.S. Cl.
  CPC ............ *H01M 4/366* (2013.01); *H01M 4/485* (2013.01); *H01M 4/525* (2013.01); *C01G 39/00* (2013.01); *C01G 39/006* (2013.01); *C01G 53/00* (2013.01); *C01G 53/006* (2013.01); *Y02E 60/122* (2013.01); *H01M 4/48* (2013.01); *H01M 4/505* (2013.01); *C01P 2002/52* (2013.01); *C01P 2002/72* (2013.01)

(56) References Cited

U.S. PATENT DOCUMENTS

| | | | |
|---|---|---|---|
| 7,282,300 | B2 | 10/2007 | Goh et al. |
| 2002/0076613 | A1 | 6/2002 | Lee et al. |
| 2004/0175621 | A1 | 9/2004 | Iriyama et al. |
| 2007/0026312 | A1 | 2/2007 | Imachi et al. |
| 2007/0077488 | A1* | 4/2007 | Chen et al. ............ 429/209 |
| 2007/0141470 | A1 | 6/2007 | Nakura |
| 2009/0325072 | A1* | 12/2009 | Maeda et al. ............ 429/220 |
| 2011/0020536 | A1* | 1/2011 | Yamamoto et al. ........ 427/126.3 |

FOREIGN PATENT DOCUMENTS

| | | | |
|---|---|---|---|
| EP | 2139059 | A1 | 12/2009 |
| JP | 06-342673 | A | 12/1994 |
| JP | 10-112318 | A | 4/1998 |
| JP | 10-255762 | A | 9/1998 |
| JP | 11-025957 | A | 1/1999 |
| JP | 2007-035589 | A | 2/2007 |
| JP | 2010-009799 | A | 1/2010 |
| JP | 2010-080196 | A | 4/2010 |
| KR | 10-2002-0046658 | A | 6/2002 |
| KR | 10-0578877 | B1 | 5/2006 |
| KR | 10-2006-0085085 | A | 7/2006 |
| KR | 10-0667951 | B1 | 1/2007 |
| KR | 10-0775077 | B1 | 11/2007 |
| KR | 10-2008-0003931 | * | 7/2009 |
| KR | 10-2009-0078128 | A | 7/2009 |
| KR | 10-0999563 | B1 | 2/2010 |
| KR | 10-2010-0032053 | A | 3/2010 |
| WO | 03/081697 | A1 | 10/2003 |
| WO | WO 2009119093 | A1 * | 10/2009 |

OTHER PUBLICATIONS

Notice of Allowance dated Oct. 22, 2012 of corresponding Korean Patent Application No. 10-2010-0070078—5 pages.

Min Gyu Kim et al., "Air Stable Al2O3-coated Li2NiO2 Cathode Additive as a Surplus Current Consumer in a Li-ion Cell", Journal of Materials Chemistry, Nov. 5, 2008, vol. 18, No. 48, pp. 5880-5887.

Yi Wen-Wen et al., "Structure and electrochemical properties of LiNixMnxCo1-2xO2 prepared by solid state reaction", Chinese Journal of Power Sources Tianjin Institute of Power Sources China, Apr. 2007, vol. 4, pp. 266-269.

European Search Report dated Sep. 19, 2013 of corresponding European Patent Application No. 11173886.0—8 pages.

Chinese Office Action dated Aug. 5, 2014 of corresponding Chinese Patent Application No. 201110198639.1 and its English translation in 21 pages.

* cited by examiner

POSITIVE ELECTRODE AND LITHIUM BATTERY INCLUDING THE SAME

RELATED APPLICATIONS

This application claims the benefit of Korean Patent Application No. 10-2010-0070078, filed on Jul. 20, 2010, in the Korean Intellectual Property Office, the disclosure of which is incorporated herein in its entirety by reference.

BACKGROUND

1. Field

The present disclosure relates to a positive electrode and a lithium battery including the positive electrode.

2. Description of the Related Art

A lithium battery converts chemical energy into electrical energy through electrochemical redox reactions between chemical substances. A typical lithium battery includes a positive electrode, a negative electrode, and an electrolyte.

Recently, as electronic devices increasingly demand high performance, batteries for such devices also need high capacity and high power output. In order to provide batteries having high capacity, an active material may need high capacity or a high battery charging voltage. For example, a silicon-based composite material having high capacity may be used as a negative active material for a negative electrode of a battery. However, silicon-based composite materials irreversibly deintercalate lithium.

SUMMARY

One or more embodiments of the present invention include a negative electrode having a novel structure, and a lithium battery including the negative electrode.

Additional aspects will be set forth in part in the description which follows and, in part, will be apparent from the description, or may be learned by practice of the presented embodiments.

According to one or more embodiments of the present invention, a positive electrode includes: a current collector; a first layer irreversibly deintercalating lithium ions; and a second layer allowing reversible intercalation and deintercalation of lithium ions.

The first and second layers may be sequentially disposed on the current collector in the order stated. The first layer may include a first active material represented by Formula 1 below:

$$Li_2Mo_{1-n}R^1_nO_3 \quad \text{Formula 1}$$

In Formula 1, 0≤n<1, and $R^1$ is selected from the group consisting of manganese (Mn), iron (Fe), cobalt (Co), copper (Cu), zinc (Zn), magnesium (Mg), nickel (Ni), and a combination of the foregoing elements.

The first layer may include a second active material represented by Formula 2 below:

$$Li_2Ni_{1-m}R^2_mO_2 \quad \text{Formula 2}$$

In Formula 2, 0≤m<1, and $R^2$ is selected from the group consisting of manganese (Mn), iron (Fe), cobalt (Co), copper (Cu), zinc (Zn), magnesium (Mg), molybdenum (Mo), and a combination of the foregoing elements.

The first layer may include a first active material represented by Formula 1 below and a second active material represented by Formula 2 below:

$$Li_2Mo_{1-n}R^1_nO_3 \quad \text{Formula 1}$$

$$Li_2Ni_{1-m}R^2_mO_2 \quad \text{Formula 2}$$

In Formula 1, 0≤n<1, and $R^1$ is selected from the group consisting of manganese (Mn), iron (Fe), cobalt (Co), copper (Cu), zinc (Zn), magnesium (Mg), nickel (Ni), and combinations of at least two of the foregoing elements. In Formula 2, 0≤m<1, and $R^2$ is selected from the group consisting of Mn, Fe, Co, Cu, Zn, Mg, molybdenum (Mo), and combinations of at least two of the foregoing elements. The second active material may further include a $Li_2Ni_8O_{10}$ phase.

The first layer may include a first sublayer and a second sublayer, in which the first sublayer is interposed between the current collector and the second sublayer. The first sublayer includes the first active material represented by Formula 1 above, and the second sublayer includes the second active material represented by Formula 2 above. The second active material may further include a $Li_2Ni_8O_{10}$ phase.

The first layer may include a first sublayer and a second sublayer, in which the first sublayer is interposed between the current collector and the second sublayer. The first sublayer includes the second active material represented by Formula 2 above. The second sublayer includes the first active material represented by Formula 1 above. The second active material may further include a $Li_2Ni_8O_{10}$ phase.

According to one or more embodiments of the present invention, a lithium battery includes: a negative electrode including a negative active material; a positive electrode comprising: a current collector; a first layer irreversibly deintercalating lithium ions; and a second layer allowing reversible intercalation and deintercalation of lithium ions; and an electrolyte. The positive electrode of the lithium battery may have the same features as described above.

The negative active material may include a material selected from the group consisting of silicon, a silicon-based composite material (for example, a silicon oxide), tin, a tin-based composite material, lithium titanate, and a combination of at least two of these materials.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, some of which are illustrated in the accompanying drawings, wherein like reference numerals refer to like elements throughout. In this regard, the presently disclosed embodiments may have different forms and should not be construed as limiting the claims to what is set forth herein. Accordingly, embodiments are described to explain various aspects, features and characteristics of the present invention.

According to embodiments, a positive electrode includes a current collector, a first layer and a second layer. The first layer contains one or more materials that irreversibly deintercalate lithium ions. The second layer second layer contains one or more materials that allow reversible intercalation and deintercalation of lithium ions. In some embodiments, the first and second layers may be sequentially stacked on the current collector in the order stated. Alternatively, in other embodiments, the first and second layers may be stacked on the current collector in the reverse order.

Figure 1:
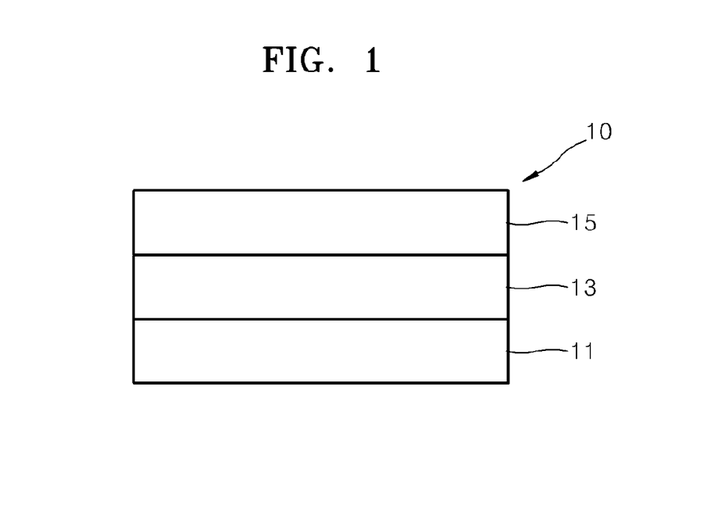
FIG. 1 is a schematic cross-sectional view of a positive electrode according to an embodiment of the present invention.

FIG. 1 is a schematic cross-sectional view of a positive electrode 10 according to an embodiment of the present invention. Referring to FIG. 1, the positive electrode 10 includes a current collector 11, a first layer 13 and a second layer 15. The first layer 13 is disposed on the current collector 11 and irreversibly deintercalates lithium ions. The second layer 15 is disposed on the first layer 13 and allows reversible intercalation and deintercalation of lithium ions.

The current collector 11 may be any one selected from the group consisting of copper foil, nickel foil, stainless steel foil, titanium foil, nickel foam, copper foam, a polymeric substrate coated with a conductive metal, and an aluminum substrate. However, any other forms of current collector may be used instead. Alternatively, the current collector 11 may be manufactured from a mixture of the materials listed above or by stacking substrates made from the materials on one another. According to embodiments, the current collector 11 may have any of a variety of structures.

In embodiments, the first layer 13 may irreversibly deintercalate lithium ions. For example, the first layer 13 deintercalates and provide lithium ions to a negative electrode during the initial charge or charging of the battery (i.e., during which the positive electrode provides for the first time lithium ions to the negative electrode). However, the first layer 13 does not allow intercalation of lithium ions during discharge following the initial charging. In other words, the first layer 13 does not take part in charge-discharge cycles of the battery. However, the second layer 15 allows reversible intercalation and deintercalation of lithium ions and is involved in charge-discharge cycles of the battery.

Thus, if the positive electrode 10 including the first layer 13 and the second layer 15 is used with a negative electrode including a negative active material capable of irreversibly deintercalating lithium ions, the first layer 13 may compensate for the irreversibility of the negative electrode, and thus, the retention of the capacity of the lithium battery may be improved. This is supported by the following explanations.

For example, let's consider a lithium battery L1 that includes a positive electrode made of only the second layer 15 (allowing irreversible intercalation and deintercalation of lithium ions) and a negative electrode made of a negative active material (capable of deintercalating 80% of the lithium ions received from the positive electrode during the initial charge. If the second layer 15 deintercalates 100 lithium ions during the initial charge, the negative electrode may, in theory, deintercalate 80 lithium ions during the discharge following the initial charge.

Meanwhile, for comparison, let's consider a lithium battery L2 that is identical to the lithium battery L1, except that the positive electrode further includes the first layer 13 capable of irreversibly deintercalating 20 lithium ions during the initial charge. Then, the positive electrode can provide 120 lithium ions (rather than 100 lithium ions) to the negative electrode during the initial charge. Thus, the negative electrode may, in theory, deintercalate 96 (=120×0.8) lithium ions during the discharge following the initial charge. In other words, the use of the first layer 13 in the positive electrode of the lithium battery L2 may compensate for the irreversibility of the negative electrode. Thus, the lithium battery L2 may have good capacity retention while maintaining substantially the same capacity as the lithium battery L1.

In embodiments, the first layer 13 may include a first active material represented by Formula 1 below:

$$Li_2Mo_{1-n}R^1{}_nO_3 \qquad \text{Formula 1}$$

In Formula 1, 0≤n<1, and $R^1$ is selected from the group consisting of manganese (Mn), iron (Fe), cobalt (Co), copper (Cu), zinc (Zn), magnesium (Mg), nickel (Ni), and a combination of these elements.

For example, the first active material may be a $Li_2MoO_3$-based active material (i.e., a compound of Formula 1 where n=0). The term "$Li_2MoO_3$-based active material" used herein refers to a material including a $Li_2MoO_3$ compound. The $Li_2MoO_3$-based active material may further include a layer and/or phase that are of a different stoichiometry from the $Li_2MoO_3$ compound. In addition, the term "-based active material" used herein may be construed in the similar way. The first active material may be a material capable of irreversibly deintercalating lithium ions.

Alternatively, the first layer 13 may include a second active material represented by Formula 2 below:

$$Li_2Ni_{1-m}R^2{}_mO_2 \qquad \text{Formula 2}$$

In Formula 2, 0≤m<1, and $R^2$ is selected from the group consisting of Mn, Fe, Co, Cu, Zn, Mg, molybdenum (Mo), and a combination of these elements.

The second active material may be a $Li_2NiO_2$-based active material. The $Li_2NiO_2$-based active material may also be a material capable of irreversibly deintercalating lithium.

When the first layer 13 includes the second active material, the second active material, for example, a $Li_2NiO_2$-based active material, may further include a $Li_2Ni_8O_{10}$ phase.

The second active material, for example, a $Li_2NiO_2$-based active material, may irreversibly discharge a large number of lithium ions and may also generate gases. For example, the $Li_2NiO_2$-based active material used as the second active material may generate $O_2$ according to Reaction 1:

$$Li_2NiO_2 \rightarrow NiO + O + 2Li$$

$Li_2O$ generated from the reaction results of Reaction 1 may react with one or more components of the electrolyte, conducting agent, and/or various additives to produce $Li_2CO_3$, which may then release $CO_2$.

As described above, the second active material, for example, a $Li_2NiO_2$-based active material, can irreversibly deintercalate lithium ions, which may generate $O_2$ and/or $CO_2$ in the lithium battery.

For example, if the $Li_2NiO_2$-based active material further includes the $Li_2Ni_8O_{10}$ phase, the phase of the second active material may be stabilized, and additional reactions of the results of Reaction 1 may be suppressed or substantially prevented. Thus, the first layer 13 including, for example, the $Li_2NiO_2$-based active material as the second active material may irreversibly deintercalate a large number of lithium ions, and may suppress or substantially prevent additional reactions generating $O_2$ and/or $CO_2$, thereby improving the stability of the positive electrode.

The $Li_2Ni_8O_{10}$ phase may be obtained by adjusting or controlling heat-treatment conditions for synthesis of the second active material, for example, a $Li_2NiO_2$-based active material. For example, $Li_2O$ and NiO are mixed in a stoichiometric ratio (1:1 molar ratio), and the resulting mixture is heat-treated under inert atmospheric conditions (for example, a $N_2$ atmosphere) at one or more temperatures from about 500° C. to 600° C. (for example, about 550° C.) for about 5 hours to about 15 hours (for example, about 10 hours). The heat-treated material may be cooled to a temperature ranging from room temperature to 100° C. Then the resulting material is further heat treated under inert atmospheric conditions (for example, a $N_2$ atmosphere) at one or more temperatures from about 500° C. to about 600° C. (for example, about 550° C.) for about 5 hours to about 15 hours (for example, about 10 hours), which provide the $Li_2NiO_2$-based active material including a $Li_2Ni_8O_{10}$ phase.

Figure 2:
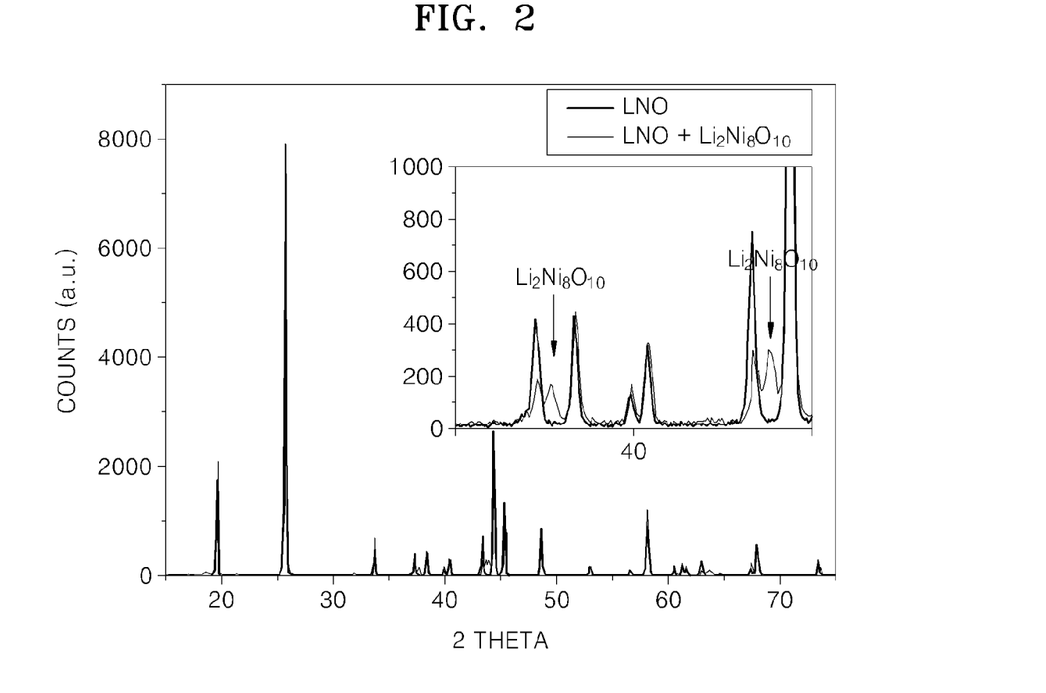
FIG. 2 is a graph of X-ray diffraction (XRD) analysis of a $Li_2NiO_2$-based active material including a $Li_2Ni_8O_{10}$ phase.

FIG. 2 is a graph of X-ray diffraction (XRD) analysis of a $Li_2NiO_2$-based active material prepared by thermally treating a mixture of $Li_2O$ and NiO in a stoichiometric ratio (1:1 molar ratio) in a $N_2$ atmosphere at 550° C. for 10 hours and then further at 550° C. for 10 hours. FIG. 2 confirms the presence of a $Li_2Ni_8O_{10}$ phase.

In some embodiments, the first layer 13 may further include both the first active material and the second active material.

While the second active material, for example, a $Li_2NiO_2$-based active material, generates $O_2$ from results of Reaction 1, the first active material, for example, a $Li_2MoO_3$-based active material, irreversibly deintercalates lithium ions and simultaneously absorbs $O_2$. In other words, although $O_2$ may be released from the second active material, the first active material can absorb $O_2$ generated from the second active material, and thus the net generation of gas in the lithium battery may be substantially prevented.

When the first layer 13 include both the first active material (for example, a $Li_2MoO_3$-based active material) and the second active material (for example, a $Li_2NiO_2$-based active material), the second active material may further include a $Li_2Ni_8O_{10}$ phase. In this case, Reaction 1 may be even suppressed, and some small amount of $O_2$ that may be generated in the lithium battery may be absorbed by the first material. Thus, the irreversibility of the negative electrode may be effectively compensated, and the stability of lithium battery can be improved.

The thickness of the first layer 13 may vary depending upon various factors, which include the material of the first layer 13, a desired structure of the lithium battery, the positive active material to be used, or the like. In embodiments, the first layer 13 may have a thickness of about 2 μm to about 30 μm. In embodiments, the first layer 13 may have a thickness of about 5 μm to about 15 μm.

The second layer 15 may allow reversible intercalation and deintercalation of lithium ions. An active material for the second layer 15 may be any appropriate positive active material for lithium batteries that allows reversible intercalation and deintercalation of lithium ions. For example, the second layer 15 may include any of the following positive active materials. However, any suitable positive active material may be used.

$Li_aA_{1-b}X_bD_2$, wherein $0.95 \leq a \leq 1.1$, and $0 \leq b \leq 0.5$; $Li_aE_{1-b}X_bO_{2-c}D_c$, wherein $0.95 \leq a \leq 1.1$, $0 \leq b \leq 0.5$, and $0 \leq c \leq 0.05$; $LiE_{2-b}X_bO_{4-c}D_c$, wherein $0 \leq b \leq 0.5$, and $0 \leq c \leq 0.05$; $Li_aNi_{1-b-c}Co_bBcD_\alpha$, wherein $0.95 \leq a \leq 1.1$, $0 \leq b \leq 0.5$, $0 \leq c \leq 0.05$, and $0 < \alpha \leq 2$; $Li_aNi_{1-b-c}Co_bX_cO_{2-\alpha}M_\alpha$, wherein $0.95 \leq a \leq 1.1$, $0 \leq b < 0.5$, $0 \leq c \leq 0.05$, and $0 < \alpha < 2$; $Li_aNi_{1-b-c}Co_bX_cO_{2-\alpha}M_2$, wherein $0.95 \leq a \leq 1.1$, $0 \leq b \leq 0.5$, $0 \leq c \leq 0.05$, and $0 < \alpha < 2$; $Li_aNi_{1-b-c}Mn_bX_cD_\alpha$, wherein $0.95 \leq a \leq 1.1$, $0 \leq b \leq 0.5$, $0 \leq c \leq 0.05$, and $0 < \alpha \leq 2$; $Li_aNi_{1-b-c}Mn_bX_cO_{2-\alpha}M_\alpha$, wherein $0.95 \leq a \leq 1.1$, $0 \leq b \leq 0.5$, $0 \leq c \leq 0.05$, and $0 < \alpha < 2$; $Li_aNi_{1-b-c}Mn_bX_cO_{2-\alpha}M_2$, wherein $0.95 \leq a \leq 1.1$, $0 \leq b \leq 0.5$, $0 \leq c \leq 0.05$, and $0 < \alpha < 2$; $Li_aNi_bE_cG_dO_2$, wherein $0.90 \leq a \leq 1.1$, $0 \leq b \leq 0.9$, $0 \leq c \leq 0.5$, and $0.001 \leq d \leq 0.1$; $Li_aNi_bCo_cMn_dG_eO_2$, wherein $0.90 \leq a \leq 1.1$, $0 \leq b \leq 0.9$, $0 \leq c \leq 0.5$, $0 \leq d \leq 0.5$, $0 \leq e \leq 0.1$; $Li_aNiG_bO_2$, wherein $0.90 \leq a \leq 1.1$, and $0.001 \leq b \leq 0.1$; $Li_aCoG_bO_2$, wherein $0.90 \leq a \leq 1.1$, and $0.001 \leq b \leq 0.1$; $Li_aMnG_bO_2$, wherein $0.90 \leq a \leq 1.1$, and $0.001 \leq b \leq 0.1$; $Li_aMn_2G_bO_4$, wherein $0.90 \leq a \leq 1.1$, and $0 \leq b \leq 0.1$; $QO_2$; $QS_2$; $LiQS_2$; $V_2O_5$; $LiV_2O_5$; $LiZO_2$; $LiNiVO_4$; $Li_{(3-f)}J_2(PO_4)_3$, wherein $0 \leq f \leq 2$; $Li_{(3-f)}Fe_2(PO_4)_3$, wherein $0 \leq f \leq 2$; $LiFePO_4$; and lithium titanate.

In the above formulae, A is selected from the group consisting of nickel (Ni), cobalt (Co), manganese (Mn), and combinations thereof; X is selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; D is selected from the group consisting of oxygen (O), fluorine (F), sulfur (S), phosphorus (P), and combinations thereof; E is selected from the group consisting of cobalt (Co), manganese (Mn), and combinations thereof; M is selected from the group consisting of fluorine (F), sulfur (S), phosphorus (P), and combinations thereof; G is selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q is selected from the group consisting of titanium (Ti), molybdenum (Mo), manganese (Mn), and combinations thereof; Z is selected from the group consisting of chromium (Cr), vanadium (V), iron (Fe), scandium (Sc), yttrium (Y), and combinations thereof; and J is selected from the group consisting of vanadium (V), chromium (Cr), manganese (Mn), cobalt (Co), nickel (Ni), copper (Cu), and combinations thereof.

The second layer 15 may include at least one compound selected from the group consisting of $LiCoO_2$, $LiMn_2O_4$, $LiFePO_4$, a compound represented by Formula 3 below, a compound represented by Formula 4 below. However, any other suitable active material may be used instead.

Formula 3

Formula 4

In Formula 3, $0.95 \leq x \leq 1.05$, $0 < p < 1$, $0 < q < 1$, $0 < r < 1$, $p+q+r=1$, and $0 < y \leq 2$. In Formula 4, $0.95 \leq n \leq 1.05$, $0 < t1 < 1$, $0 < t2 < 1$, $0 < t3 < 1$, $t1+t2+t3=1$, and $0 < m \leq 2$. In Formulae 3 and 4, x, p, q, r, y, n, t1, t2, t3, and m indicate molar ratios of the elements.

For example, $0.97 \leq x \leq 1.03$, p may be 0.5, q may be 0.2, r may be 0.3, and y may be 2. However, x, p, q, r and y may be appropriately varied. For example, the active material of Formula 3 may be a $LiNi_{0.5}Co_{0.2}Mn_{0.3}O_2$ compound. However, any suitable active material according to Formula 3 may be used.

For example, in Formula 4, t1=t2=t31. However, t1, t2 and t3 may be appropriately varied. For example, in the third active material of Formula 4, n=1, m=2, and t1=t2=t3.

A thickness ratio of the first layer 13 to the second layer 15 may be from about 5:95 to about 30:70. For example, the thickness ratio of the first layer 13 to the second layer 15 may be from about 5:95 to about 20:80. However, the thickness if the two layers may be adjusted for any suitable ratio. The thickness ratio of the first layer 13 to the second layer 15 may be appropriately varied within the foregoing ranges, in consideration of the used positive active material, the desired structure of the lithium battery, and the like.

Figure 3:
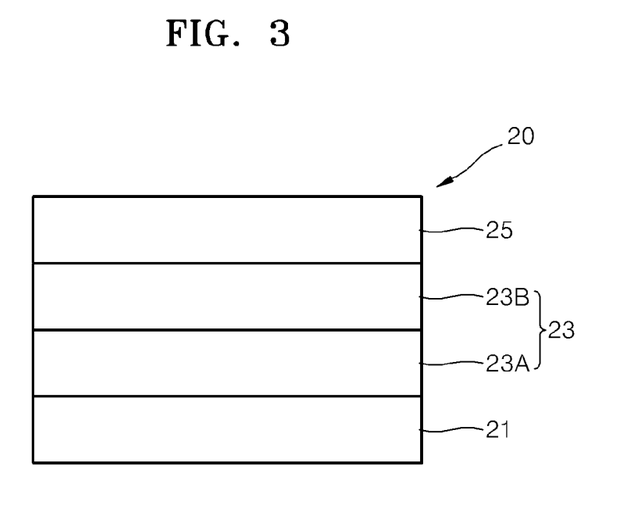
FIG. 3 is a schematic cross-sectional view of a positive electrode according to another embodiment of the present invention.

FIG. 3 is a schematic cross-sectional view of a positive electrode 20 according to another embodiment. Referring to FIG. 3, the positive electrode 20 includes a current collector 20, a first layer 23, a second layer 25. The first layer 23 is disposed on the current collector 20 and irreversibly deintercalates lithium ions. The second layer 25 is disposed on the first layer 23 and allows reversible intercalation and deintercalation of lithium ions. The discussion of current collector 11 and second layer 15 in connection with FIG. 1 above is all applicable to the current collector 21 and the second layer 25.

The first layer 23 may include a first sublayer 23A and a second sublayer 23B. As illustrated, the first sublayer 23A is interposed between the current collector 21 and the second sublayer 23B, which in turn is interposed between the first sublayer 23A and the second layer 25.

The first sublayer 23A may include a first active material represented by Formula 1 below. The second sublayer 23B may include a second active layer represented by Formula 2.

| Formula 1 | Formula 2 |
|---|---|
| $Li_2Mo_{1-n}R^1_nO_3$ | $Li_2Ni_{1-m}R^2_mO_2$ |

In Formula 1, $0 \leq n \leq 1$, and $R^1$ is selected from the group consisting of Mn, Fe, Co, Cu, Zn, Mg, Ni, and combinations of at least two of the foregoing elements. In Formula 2, $0 \leq m < 1$, and $R^2$ is selected from the group consisting of Mn, Fe, Co, Cu, Zn, Mg, Mo, and combinations of at least two of the foregoing elements.

The first active material may be a $Li_2MoO_3$-based active material. The second active material may be a $Li_2NiO_2$-based active material. However, any other suitable materials can be used for the first and second active materials. The second sublayer 23B may include a second active material, for example, capable of irreversibly deintercalating a large number of lithium ions. The second active material may generate $O_2$, as described above. However, the net generation of $O_2$ by the second sublayer 23b may be suppressed or prevented, since the first sublayer 23A including the first active material, for example, a $Li_2MoO_3$-based active material, may absorb $O_2$. Thus, the irreversibility of the negative electrode may be compensated by the first layer 23, and thus, an improved capacity retention rate and guaranteed stability of the lithium battery may be attained.

In embodiments, the second active material, for example, a $Li_2NiO_2$-based active material, may further include a $Li_2Ni_8O_{10}$ phase. In some embodiments, the first sublayer 23A may include the second active material, for example, a $Li_2NiO_2$-based active material, and the second sublayer 23B may include the first active material, for example, a $Li_2MoO_3$-based active material. The second active material in the first intermediate layer 23A may further include a $Li_2Ni_8O_{10}$ phase.

The thickness ratio of the first sublayer 23A to the second sublayer 23B may vary depending on various factors, which include the active materials, the desired level of performance of the lithium battery, and the like. For example, the thickness ratio of the first sublayer 23A to the second sublayer 23B may be from about 5:95 to about 95:5. For example, the thickness ratio of the first sublayer 23A to the second sublayer 23B may be from about 72:25 to about 25:75.

The positive electrode is described in more detail above. Although the positive electrode is described with reference to the non-limiting embodiments of FIGS. 1 and 3, the positive electrode may have any of a variety of structures.

According to embodiments, a lithium battery includes: a negative electrode including a negative active material; a current collector; a positive electrode containing at least one positive active material; and an electrolyte. In embodiments, the positive electrode includes a first layer that irreversibly deintercalates lithium ions, and a second layer that allows reversible intercalation and deintercalation of lithium ions.

In embodiments, the negative active material may be selected from various negative active materials suitable for lithium batteries. For example, the negative active material may be a negative active material having high capacity. For example, the negative active material may be a material that has high capacity, but allows irreversible deintercalation of lithium ions.

Examples of the negative active material include silicon, a silicon-based composite material, tin, a tin-based composite material, lithium titanate, and a combination of at least two of these materials. However, any other suitable material may be used instead.

For example, the negative electrode may include a silicon thin film or a silicon-based composite material. The silicon-based composite material may contain silicon and at least one non-silicon material and/or element. For example, the silicon-based composite material is selected from the group consisting of a silicon oxide, a silicon-graphite composite material, a silicon oxide-graphite composite material, a silicon-carbon nanotube composite material, a silicon oxide-carbon nanotube composite material, and a material represented as $Si-M_1$ wherein $M_1$ is selected from the group consisting of Al, Sn, Ag, Fe, Bi, Mg, Zn, In, Ge, Pb, Ti, and a combination of at least two of these elements. However, any other suitable material may be used instead.

In the silicon thin film or the silicon-based composite material that has high capacity, a Lewis' acid, such as $PF_5$ or HF can be produced when a lithium salt is decomposed in the electrolyte during the charge and discharge cycles and Lewis' acid may break down Si—Si bonds and irreversibly form Si—F bonds. Si—F bonds have a strong binding force and are stable, and thus, cause irreversible reactions in the negative electrode.

For example, the tin-based composite material is selected from the group consisting of a tin-graphite composite material, a tin-carbon nanotube composite material, and a material represented as $Sn-M_2$ wherein $M_2$ is selected from the group consisting of Al, Si, Ag, Fe, Bi, Mg, Zn, In, Ge, Pb, Ti and a combination of at least two of these elements. However, any other suitable material may be used instead.

Examples of the lithium titanate include spinel-structured lithium titanate, anatase-structured lithium titanate, and ramsdellite-structured lithium titanate, which are classified according to their crystal structures.

For example, the negative active material may be $Li_{4-x}Ti_5O_{12}(0 \leq x \leq 3)$. For example, the negative active material may be $Li_4Ti_5O_{12}$. However, any other suitable material may be used instead.

Similar to the silicon-based thin film or silicon-based composite material, tin, tin-based composite materials, and lithium titanate have high capacity, but irreversibly deintercalate lithium ions, and thus, may lead to a poor capacity retention rate.

However, if the negative electrode having high capacity but a poor capacity retention rate is used in a lithium battery with the positive electrode including the first layer, the lithium battery may have high capacity characteristics and a good capacity retention rate. This is because the negative electrode is provided with the lithium ions irreversibly deintercated by the first layer of the positive electrode. The first layer described above may be implemented in various forms. According to embodiments of the first layer, net gas generation in a lithium battery may be significantly prevented or reduced, and the lithium battery may have improved stability.

For example, the negative electrode that may be used together with the positive electrode described above may include a silicon composite material (for example, a silicon oxide) as a negative active material. However, any other suitable negative active material may be used instead.

The electrolyte may include a nonaqueous organic solvent and a lithium salt. The nonaqueous organic solvent in the electrolyte may function as a migration medium of ions involved in electrochemical reactions of the lithium battery. Examples of the nonaqueous organic solvent include a carbonate-based solvent, an ester-based solvent, an ether-based solvent, a ketone-based solvent, an alcohol-based solvent, and an aprotic solvent.

Examples of the carbonate-based solvent include dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), and butylene carbonate (BC). However, any other suitable carbonate-based solvent may be used instead.

Examples of the ester-based solvent include methyl acetate, ethyl acetate, n-propyl acetate, dimethyl acetate, methyl propionate, ethyl propionate, γ-butyrolactone (GBL), decanolide, valerolactone, mevalonolactone, and caprolactone. However, any other suitable ester-based solvent may be used instead.

Examples of the ether-based solvent include dibutyl ether, tetraglyme, diglyme, dimethoxy ethane, 2-methyltetrahydrofuran, and tetrahydrofuran. However, any other suitable ether-based solvent may be used instead.

An example of the ketone-based solvent is cyclohexanone. However, any other suitable ketone-based solvent may be used instead.

Examples of the alcohol-based solvent include ethyl alcohol, and isopropyl alcohol. However, any other suitable alcohol-based solvent may be used instead.

Examples of the aprotic solvent include nitriles (such as R—CN, where R is a $C_2$-$C_{20}$ linear, branched, or cyclic hydrocarbon-based moiety that may include a double-bonded aromatic ring or an ether bond), amides (such as dimethylformamide), dioxolanes (such as 1,3-dioxolane), and sulfolanes. However, any other suitable aprotic solvent may be used instead.

The nonaqueous organic solvent may include a single solvent used alone or a combination of at least two solvents. If a combination of solvents is used, the ratio of the nonaqueous organic solvents may vary according to the desired performance of the lithium battery, which will be obvious to one of ordinary skill in the art.

For example, the nonaqueous organic solvent may be a mixture of ethylene carbonate (EC) and ethylmethyl carbonate (EMC) in a volume ratio of about 3:7. For example, the nonaqueous organic solvent may be a mixture of EC, GBL, and EMC in a volume ratio of about 3:3:4.

The lithium salt in the electrolyte solution is dissolved in the nonaqueous organic solvent and functions as a source of lithium ions in the lithium battery, and accelerates the migration of lithium ions between the positive electrode and the negative electrode.

For example, the lithium salt may include at least one supporting electrolyte salt selected from the group consisting of $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_yF_{2x+1}SO_2)(C_yF_{2y+1}SO_2)$ (where x and y are each independently a natural number), LiCl, LiI, and $LiB(C_2O_4)_2$ (lithium bis(oxalato) borate or LiBOB). In embodiments, the electrolyte salt may be a combination of two or more of the foregoing electrolyte salts.

The concentration of the lithium salt may be in a range of about 0.1 M to about 2.0 M. For example, the concentration of the lithium salt may be about 0.6 M to about 2.0 M. When the concentration of the lithium salt is within these ranges, the first electrolyte may have the desired conductivity and viscosity, and thus lithium ions may efficiently migrate.

The electrolyte may further include an additive capable of improving the low-temperature performance of the lithium battery. Examples of the additive include a carbonate-based material and propane sulton (PS). However, any suitable additive may be used. Furthermore, one additive may be used, or a combination of additives may be used.

Examples of the carbonate-based material include vinylene carbonate (VC); vinylene carbonate (VC) derivatives having at least one substituent selected from the group consisting of halogen atoms (such as F, Cl, Br, and I), cyano groups (CN), and nitro groups ($NO_2$); and ethylene carbonate (EC) derivatives having at least one substitutent selected from the group consisting of halogen atoms (such as F, Cl, Br, and I), cyano groups (CN), and nitro groups ($NO_2$). However, any suitable carbonate-based material may be used.

The electrolyte may further include at least one additive selected from the group consisting of vinylene carbonate (VC), fluoroethylene carbonate (FEC), and propane sulton (PS).

The amount of the additive may be about 10 parts or less by weight based on 100 parts by weight of the total amount of the nonaqueous organic solvent and the lithium salt. For example, the amount of the additive may be in a range of about 0.1 parts by weight to about 10 parts by weight based on 100 parts by weight of the total amount of the nonaqueous organic solvent and the lithium salt. When the amount of the additive is within these ranges, the lithium battery may have satisfactorily improved low-temperature characteristics.

For example, the amount of the additive may be in a range of about 1 part by weight to about 5 parts by weight based on 100 parts by weight of the total amount of the nonaqueous organic solvent and the lithium salt. The amount of the additive may be in a range of about 2 parts by weight to about 4 parts by weight, based on 100 parts by weight of the total amount of the nonaqueous organic solvent and the lithium salt.

For example, the amount of the additive may be about 2 parts by weight based on 100 parts by weight of the total amount of the nonaqueous organic solvent and the lithium salt.

A separator may be positioned between the positive electrode and the negative electrode according to embodiments of lithium battery. Any separator commonly used for lithium batteries may be used. In an embodiment, the separator may have low resistance to the migration of ions in an electrolyte and a high electrolyte-retaining ability. Examples of materials used to form the separator include glass fiber, polyester, Teflon, polyethylene, polypropylene, polytetrafluoroethylene (PTFE), and combinations thereof, each of which may be a nonwoven or woven fabric. In one embodiment, a rollable separator formed of a material such as polyethylene and polypropylene may be used for lithium ion batteries. In another embodiment, a separator capable of retaining a large amount of an organic electrolyte may be used for lithium ion polymer batteries. These separators may be prepared according to the following process.

A polymer resin, a filler, and a solvent are mixed to prepare a separator composition. Then, the separator composition may be coated directly on an electrode, and then dried to form a separator film. Alternatively, the separator composition may be cast on a separate support and then dried to form a separator composition film, which is then removed from the support and laminated on an electrode to form a separator film.

The polymer resin may be any material commonly used as a binder for electrode plates. Examples of the polymer resin include a vinylidenefluoride/hexafluoropropylene copolymer, polyvinylidenefluoride, polyacrylonitrile, polymethylmethacrylate, and mixtures thereof. However, any suitable polymer resin may be used. For example, a vinylidenefluoride/hexafluoropropylene copolymer containing about 8 to about 25 wt % of hexafluoropropylene may be used.

Figure 4:
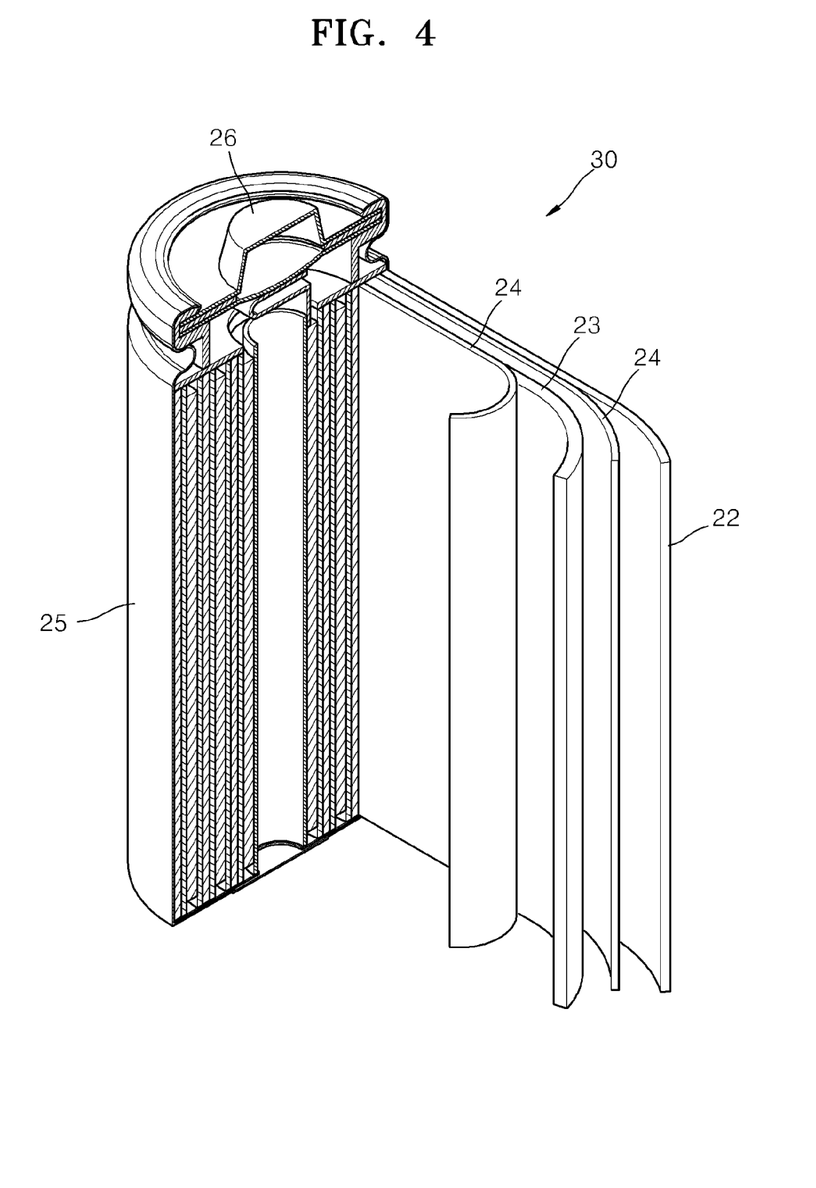
FIG. 4 is a schematic cross-sectional view illustrating a structure of a lithium battery according to an embodiment of the present invention.

FIG. 4 is a schematic perspective view of a lithium battery 30 according to an embodiment of the present invention. Referring to FIG. 4, the lithium battery 30 includes an electrode assembly having a positive electrode 23, a negative electrode 22, and a separator 24 between the positive electrode 23 and the negative electrode 22. The electrode assembly is contained within a battery case 25, and a sealing member 26 seals the battery case 25. An electrolyte (not shown) is injected into the battery case 25 to impregnate the electrolyte assembly. The lithium battery 30 is manufactured by sequentially stacking the positive electrode 23, the negative electrode 22, and the separator 24 on one another to form a stack, rolling the stack, and inserting the rolled up stack into the battery case 25.

The type of the lithium battery is not particularly limited, and may be, for example, a lithium secondary battery such as a lithium ion battery, a lithium ion polymer battery, a lithium sulfur battery, or the like, or a lithium primary battery.

A method of manufacturing the lithium battery will now be described in detail. A positive electrode may be manufactured by forming first and second layers on a current collector. For example, a method of forming the first layer involves mixing a first active material represented by Formula 1 and/or a second active material represented by Formula 2 with a binder and a solvent to prepare a first layer composition. Then, the first layer composition is coated directly on a current collector (for example, an aluminum current collector) to form the first layer. Then, a second layer composition including an active material that allows reversible intercalation and deintercalation of lithium ions, a binder, and a solvent is coated on the first layer and is then dried to form the second layer, thereby manufacturing a positive electrode plate. Alternatively, the first and second layer compositions may be cast on separate supports, respectively, to form the first and second layers, which are then separated from the supports and laminated on the current collector to manufacture a positive electrode plate. Nonlimiting examples of suitable solvents include N-methylpyrrolidone, acetone, water, and the like.

Alternatively, a first sublayer composition, a second sublayer composition, and a second layer composition may be separately prepared and sequentially coated on a current collector to form a first sublayer, a second sublayer and a second layer, respectively. Active materials added to these compositions are described in more detail above.

The binders in the first and second layers are to bind active material particles together and to the current collector. Nonlimiting examples of the binders include polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber (SBR), acrylated SBR, epoxy resin, and nylon.

The first layer and/or the second layer may further include a conducting agent for providing conductivity to the positive electrode. Any other electron conducting materials that would not induce chemical changes in batteries may be used. Examples of the conducting agent may include carbonaceous materials, such as natural graphite, artificial graphite, carbon black, acetylene black, ketjen black, carbon fibers, and the like; metal-based materials, such as copper (Cu), nickel (Ni), aluminum (Al), silver (Ag), and the like, in powder or fiber form; and conductive materials, including conductive polymers, such as a polyphenylene derivative, and mixtures thereof.

The current collector may be aluminum (Al). However, any other suitable material may be used instead.

Similarly, a negative active material, a conducting agent, a binder, and a solvent are mixed to prepare a negative active material composition. The negative active material composition is coated directly on a current collector (for example, a Cu current collector), or is cast on a separate support to form a negative active material film, which is then separated from the support and laminated on a Cu current collector to obtain a negative electrode plate. In this regard, the amounts of the negative active material, the conducting agent, the binder, and the solvent may be amounts commonly used in lithium batteries. According to embodiments, the negative electrode may be manufactured using plating or any of a variety of methods.

The conducting agent, the binder, and the solvent in the negative active material composition may be the same as those used in the positive active material composition. If required, a plasticizer may be further added to each of the positive electrode active material composition and the negative electrode active material composition to produce pores in the electrode plates.

The separator is positioned between the positive electrode plate and the negative electrode plate to form a battery assembly, which is then wound or folded. The primary assembly is then encased in a cylindrical or rectangular battery case. Then, an electrolyte is injected into the battery case, thereby completing the manufacture of a lithium battery assembly.

Hereinafter, one or more embodiments of the present invention will be described in more detail with reference to the following examples. However, these examples are not intended to limit the scope of the present invention.

EXAMPLES

Example 1

A $SiO_x$ negative active material and a polyvinylidene fluoride (PVDF) binder were mixed in weight ratio of 90:10 in an N-methylpyrrolidone solvent to prepare negative electrode slurry. The negative electrode slurry was coated on a copper (Cu)-foil to form a thin negative electrode plate having thickness of 14 μm, and dried at 135° C. for 20 minutes to provide a negative electrode.

A $Li_2MoO_3$ active material, a PVDF binder, and a carbon conducting agent were dispersed in weight ratio of 96:2:2 in an N-methylpyrrolidone solvent to prepare a first layer composition. The first layer composition was coated on an aluminum (Al)-foil to form a thin electrode plate having thickness of 60 μm, and dried at 135° C. for 20 minutes to form a first layer having thickness of 35 μm (including the $Li_2MoO_3$ active material).

A $LiCoO_2$ active material, a PVDF binder, and a carbon conducting agent were dispersed in weight ratio of 96:2:2 in an N-methylpyrrolidone solvent to prepare a second layer composition. The second layer composition was coated on the first layer to form a thin electrode plate having thickness of 60 μm, dried at 135° C. for 3 hours or longer, and then pressed to form a second layer having thickness of 35 μm (including the $LiCoO_2$ active material), thereby completing the manufacture of a positive electrode.

1.0M LiPF$_6$ was added to a mixture of ethylene carbonate (EC) and ethylmethyl carbonate (EMC) (in volume ratio of 3:7) to prepare an electrolyte.

The negative electrode, the positive electrode, the electrolyte, and a porous polyethylene (PE) separator film were assembled to manufacture a coin cell battery.

Example 2

A lithium battery was manufactured in the same manner as in Example 1, except that Li$_2$NiO$_2$, instead of Li$_2$MoO$_3$, was used in the first layer composition. The first layer of the lithium battery included the Li$_2$NiO$_2$ active material.

Example 3

A lithium battery was manufactured in the same manner as in Example 1, except that Li$_2$NiO$_2$ including a Li$_2$Ni$_8$O$_{10}$ phase was used in the first layer composition, instead of Li$_2$MoO$_3$. The first layer of the lithium battery included the Li$_2$Ni$_8$O$_{10}$ phase-included Li$_2$NiO$_2$ active material.

The Li$_2$NiO$_2$ active material including Li$_2$Ni$_8$O$_{10}$ phase was synthesized as follow. A mixture of Li$_2$O and NiO in stoichiometric ratio (1:1 molar ratio) was thermally treated in N$_2$ atmosphere at 550° C. for 10 hours and then further at 550° C. for 10 hours. FIG. 2 is a graph of X-ray diffraction (XRD) analysis of the Li$_2$NiO$_2$ active material.

Example 4

A lithium battery was manufactured in the same manner as in Example 1, except that Li$_2$NiO$_2$ including Li$_2$Ni$_8$O$_{10}$ phase was further added to the first layer composition. The first layer of the lithium battery included both the Li$_2$Ni$_8$O$_{10}$ phase-included Li$_2$NiO$_2$, and Li$_2$MoO$_3$. Weight ratio of the Li$_2$Ni$_8$O$_{10}$ phase-included Li$_2$MoO$_3$ to Li$_2$NiO$_2$ was about 75:25.

Example 5

A lithium battery was manufactured in the same manner as in Example 1, except that a first sublayer and a second sublayer were sequentially formed to obtain a first layer, instead of the first layer according to Example 1. A Li2MoO3 active material, a PVDF binder, and a carbon conducting agent (an acetylene black, DENKA BLACK) were dispersed in weight ratio of 96:2:2 in an N-methylpyrrolidone solvent to prepare a composition for the first sublayer. The first sublayer composition was coated on a aluminum (Al)-foil to form a thin electrode plate having thickness of 60 μm, and dried at 135° C. for 3 hours or longer to form the first sublayer having thickness of 35 μm. A Li2NiO2 binder, a PVDF binder, and a carbon conducting agent (an acetylene black, DENKA BLACK) were dispersed in a weight ratio of 96:2:2 in an N-methylpyrrolidone solvent to prepare a composition for the second sublayer. The second sublayer composition was coated on the first sublayer to form a thin electrode plate having thickness of 60 μm, and dried at 135° C. for 3 hours or longer to form the second sublayer having thickness of 35 μm.

Example 6

A lithium battery was manufactured in the same manner as in Example 1, except that a first sublayer and a second sublayer were sequentially formed to obtain a first layer, instead of the first layer according to Example 1. A Li2NiO2 active material, a PVDF binder, and a carbon conducting agent (an acetylene black, DENKA BLACK) were dispersed in a weight ratio of 96:2:2 in an N-methylpyrrolidone solvent to prepare a first sublayer composition. The first sublayer composition was coated on an aluminum (Al)-foil to form a thin electrode plate having thickness of 60 μm, and dried at 135° C. for 3 hours or longer to form the first sublayer having thickness of 35 μm. A Li2MoO3 binder, a PVDF binder, and a carbon conducting agent (an acetylene black, DENKA BLACK) were dispersed in weight ratio of 96:2:2 in an N-methylpyrrolidone solvent to prepare a second sublayer composition. The second sublayer composition was coated on the first sublayer to form a thin electrode plate having thickness of 60 μm, and dried at 135° C. for 3 hours or longer to form the second sublayer having thickness of 35 μm.

Comparative Example 1

A lithium battery was manufactured in the same manner as in Example 1, except that no first layer was formed, unlike Example 1.

Evaluation of Examples

Figure 5:
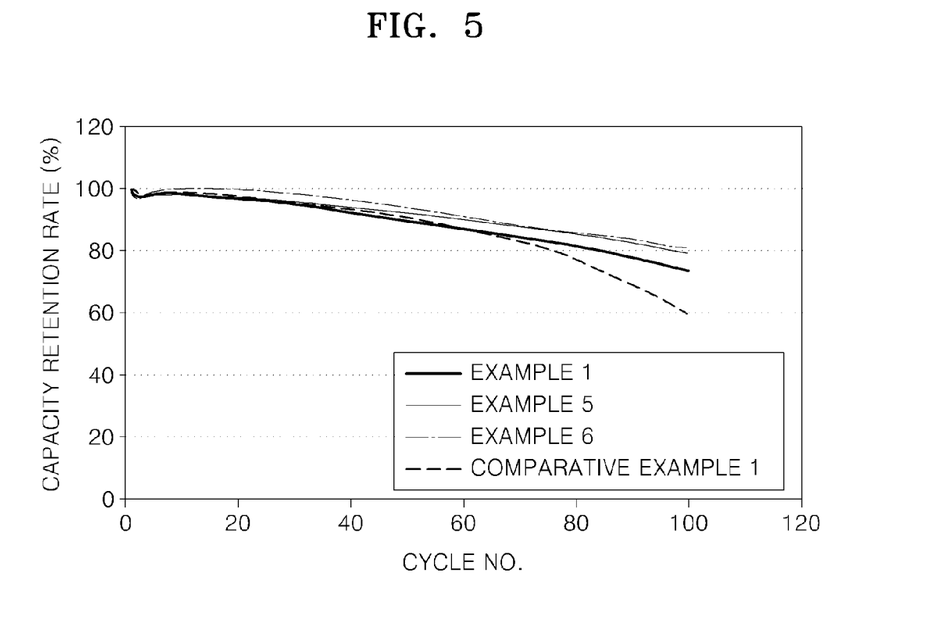
FIG. 5 is a graph of cycle lifetime of lithium batteries manufactured according to Comparative Example 1 and Examples 1, 5 and 6.

The lithium batteries of Comparative Example 1 and Examples 1, 5 and 6 were left at room temperature (25° C.) for 20 hours and were then subjected to charging and discharging (formation process) of the lithium batteries at the rate of 0.05 C. After completion of the formation process, the lithium batteries were charged in a constant current/constant voltage (CC/CV) mode at the rate of 0.6 C, charge voltage of 4.35V and charge cut-off current of 0.06 C and then discharged at the rate of 1 C and discharge cut-off voltage of 2.5V. This charge and discharge cycle was repeated to measure the capacity and 0.6 C/1 C cycle lifetime of each of the lithium batteries. The 0.6 C/1 C cycle lifetime was measured as a relative capacity percentage with respect to the overall initial cycle capacity. The results are shown in FIG. 5. Referring to FIG. 5, the lithium batteries of Examples 1, 5 and 6 show better lifetime characteristics than the lithium battery of Comparative Example 1.

As described above, according to the one or more of the above embodiments of the present invention, a lithium battery including the positive electrode according to embodiments may have good capacity retention characteristics and stability even when using a negative electrode including a negative active material that irreversibly deintercalates lithium ions.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A positive electrode comprising:
   a current collector;
   a first layer irreversibly deintercalating lithium ions; and
   a second layer allowing reversible intercalation and deintercalation of lithium ions,
   wherein the first layer is interposed between the current collector and the second layer,
   wherein a thickness ratio of the first layer to the second layer is from about 5:95 to about 30:70.

2. The positive electrode of claim 1, wherein the first layer comprises a first active material represented by Formula 1 below:

Formula 1 wherein, in Formula 1, 0≤n<1, and $R^1$ is selected from the group consisting of manganese (Mn), iron (Fe), cobalt (Co), copper (Cu), zinc (Zn), magnesium (Mg), nickel (Ni), and a combination of the foregoing elements.

3. The positive electrode of claim 1, wherein the first layer comprises a second active material represented by Formula 2 below:

$$Li_2Ni_{1-m}R^2{}_mO_2 \qquad \text{Formula 2}$$

wherein, in Formula 2, 0≤m<1, and $R^2$ is selected from the group consisting of manganese (Mn), iron (Fe), cobalt (Co), copper (Cu), zinc (Zn), magnesium (Mg), molybdenum (Mo), and a combination of the foregoing elements.

4. The positive electrode of claim 3, wherein the second active material further comprises a $Li_2Ni_8O_{10}$ phase.

5. The positive electrode of claim 1, wherein the first layer comprises a first active material represented by Formula 1 below and a, second active material represented by Formula 2 below:

| Formula 1 | Formula 2 |
|---|---|
| $Li_2Mo_{1-n}R^1{}_nO_3$ | $Li_2Ni_{1-m}R^2{}_mO_2$ | wherein, in Formula 1, 0≤n<1; and $R^1$ is selected from the group consisting of manganese (Mn), iron (Fe), cobalt (Co), copper (Cu), zinc (Zn), magnesium (Mg), nickel (Ni), and combinations of at least two of the foregoing elements; and wherein in Formula 2, 0≤m<1; and $R^2$ is selected from the group consisting of Mn, Fe, Co, Cu, Zn, Mg, molybdenum (Mo), and combinations of at least two of the immediately foregoing elements.

6. The positive electrode of claim 1, wherein the first layer comprises a first sublayer and a second sublayer, the first sublayer interposed between the current collector and the second sublayer, the first sublayer comprising a first active material represented by Formula 1 below, and the second sublayer comprising a second active material represented by Formula 2 below:

| Formula 1 | Formula 2 |
|---|---|
| $Li_2Mo_{1-n}R^1{}_nO_3$ | $Li_2Ni_{1-m}R^2{}_mO_2$ | wherein, in Formula 1, 0≤n<1; and $R^1$ is selected from the group consisting of manganese (Mn), iron (Fe), cobalt (Co), copper (Cu), zinc (Zn), magnesium (Mg), nickel (Ni), and combinations of at least two of the foregoing elements, and wherein, in Formula 2, 0≤m<1; and $R^2$ is selected from the group consisting of Mn, Fe, Co, Cu, Zn, Mg, molybdenum (Mo), and combinations of at least two of the foregoing elements.

7. The positive electrode of claim 1, wherein the first layer comprises a first sublayer and a second sublayer, the first sublayer interposed between the current collector and the second sublayer, the first sublayer comprising a second active material represented by Formula 2 below, and the second sublayer comprising a first active material represented by Formula 1 below:

| Formula 1 | Formula 2 |
|---|---|
| $Li_2Mo_{1-n}R^1{}_nO_3$ | $Li_2Ni_{1-m}R^2{}_mO_2$ | wherein, in Formula 1, 0≤n<1; and $R^1$ is selected from the group consisting of manganese (Mn), iron (Fe), cobalt (Co), copper (Cu), zinc (Zn), magnesium (Mg), nickel (Ni), and combinations of at least two of the foregoing elements, and wherein, in Formula 2, 0≤m<1; and $R^2$ is selected from the group consisting of Mn, Fe, Co, Cu, Zn, Mg, molybdenum (Mo), and combinations of at least two of the foregoing elements.

8. A lithium battery comprising:
a negative electrode including a negative active material;
a positive electrode comprising: a current collector, a first layer irreversibly deintercalating lithium ions, and a second layer allowing reversible intercalation and deintercalation of lithium ions; and
an electrolyte,
wherein the first layer is interposed between the current collector and the second layer,
wherein a thickness ratio of the first layer to the second layer is from about 5:95 to about 30:70.

9. The lithium battery of claim 8, wherein the first layer comprises a first active material represented by Formula 1 below:

$$Li_2Mo_{1-n}R^1O_3 \qquad \text{Formula 1}$$

wherein, in Formula 1, 0≤n<1, and $R^1$ is selected from the group consisting of manganese (Mn), iron (Fe), cobalt (Co), copper (Cu), zinc (Zn), magnesium (Mg), nickel (Ni), and a combination of the foregoing elements.

10. The lithium battery of claim 8, wherein the first layer comprises a second active material represented by Formula 2 below:

$$Li_2Ni_{1-m}R^2{}_mO_2 \qquad \text{Formula 2}$$

wherein, in Formula 2, 0≤m<1, and $R^2$ is selected from the group consisting of manganese (Mn), iron (Fe), cobalt (Co), copper (Cu), zinc (Zn), magnesium (Mg), molybdenum (Mo), and a combination of the foregoing elements.

11. The lithium battery of claim 8, wherein the first layer comprises a first active material represented by Formula 1 below and a second active material represented by Formula 2 below:

| Formula 1 | Formula 2 |
|---|---|
| $Li_2Mo_{1-n}R^1{}_nO_3$ | $Li_2Ni_{1-m}R^2{}_mO_2$ | wherein, in Formula 1, 0≤n<1, and $R^1$ is selected from the group consisting of manganese (Mn), iron (Fe), cobalt (Co), copper (Cu), zinc (Zn), magnesium (Mg), nickel (Ni), and combinations of at least two of the foregoing elements, and wherein, in Formula 2, 0≤m<1; and $R^2$ is selected from the group consisting of Mn, Fe, Co, Cu, Zn, Mg, molybdenum (Mo), and combinations of at least two of the foregoing elements.

12. The lithium battery of claim 11, wherein the second active material further comprises a $Li_2Ni_8O_{10}$ phase.

13. The lithium battery of claim 8, wherein the first layer comprises a first sublayer and a second sublayer, the first sublayer interposed between the current collector and the second sublayer, the first sublayer comprising a first active material represented by Formula 1 below, and the second sublayer comprising a second active material represented by Formula 2 below:

| Formula 1 | Formula 2 |
|---|---|
| $Li_2Mo_{1-n}R^1_nO_3$ | $Li_2Ni_{1-m}R^2_mO_2$ | wherein, in Formula 1, $0 \leq n < 1$, and $R^1$ is selected from the group consisting of manganese (Mn), iron (Fe), cobalt (Co), copper (Cu), zinc (Zn), magnesium (Mg), nickel (Ni), and combinations of at least two of the foregoing elements, and wherein, in Formula 2, $0 \leq m < 1$; and $R^2$ is selected from the group consisting of Mn, Fe, Co, Cu, Zn, Mg, molybdenum (Mo), and combinations of at least two of the foregoing elements.

14. The lithium battery of claim 13, wherein the second active material further comprises a $Li_2Ni_8O_{10}$ phase.

15. The lithium battery of claim 8, wherein the first layer comprises a first sublayer and a second sublayer, the first sublayer interposed between the current collector and the second sublayer, the first sublayer comprising a second active material represented by Formula 2 below, and the second sublayer comprising a first active material represented by Formula 1 below:

| Formula 1 | Formula 2 |
|---|---|
| $Li_2Mo_{1-n}R^1_nO_3$ | $Li_2Ni_{1-m}R^2_mO_2$ | wherein, in Formula 1, $0 \leq n < 1$, and $R^1$ is selected from the group consisting of manganese (Mn), iron (Fe), cobalt (Co), copper (Cu), zinc (Zn), magnesium (Mg), nickel (Ni), and combinations of at least two of the foregoing elements, and wherein, in Formula 2, $0 \leq m < 1$, and $R^2$ is selected from the group consisting of Mn, Fe, Co, Cu, Zn, Mg, molybdenum (Mo), and combinations of at least two of the foregoing elements.

16. The lithium battery of claim 15, wherein the second active material further comprises a $Li_2Ni_8O_{10}$ phase.

17. The lithium battery of claim 16, wherein the negative active material comprises a material selected from the group consisting of silicon, a silicon-based composite material, tin, a tin-based composite material, lithium titanate, and a combination of at least two of these materials.

18. The lithium battery of claim 8, wherein the negative active material comprises silicon oxide.

* * * * *